United States Patent [19]

Matsunaga et al.

[11] Patent Number: 5,139,767
[45] Date of Patent: Aug. 18, 1992

[54] PRODUCTION METHOD OF GOETHITE

[75] Inventors: Mitsurou Matsunaga, Kamakura; Isamu Morita, Takaishi; Nobuhiro Fukuda, Yokohama, all of Japan

[73] Assignee: Mitsui Toatsu Chemicals, Incorporated, Tokyo, Japan

[21] Appl. No.: 635,426

[22] Filed: Jan. 4, 1991

Related U.S. Application Data

[63] Continuation of Ser. No. 398,292, Aug. 23, 1989, abandoned, which is a continuation of Ser. No. 751,963, Jul. 5, 1985, abandoned, which is a continuation of Ser. No. 597,693, May 6, 1984, abandoned, which is a continuation of Ser. No. 450,535, Dec. 17, 1982, abandoned.

[51] Int. Cl.$^5$ .............................................. C01G 49/06
[52] U.S. Cl. ..................................... 423/633; 423/632; 252/62.56; 252/62.6; 252/62.62
[58] Field of Search ............................ 423/632–634; 252/62.56, 62.6, 62.62

[56] References Cited

U.S. PATENT DOCUMENTS

| | | | |
|---|---|---|---|
| 3,743,707 | 7/1973 | Iwase et al. | 423/594 |
| 4,060,596 | 11/1977 | Nakamura | 423/633 |
| 4,061,726 | 12/1977 | Ohlinger et al. | 423/634 |
| 4,112,063 | 9/1978 | Buxbaum et al. | 423/633 |
| 4,376,714 | 3/1983 | Pingaud | 252/62.56 |

FOREIGN PATENT DOCUMENTS

| | | |
|---|---|---|
| 3026686 | 3/1982 | Fed. Rep. of Germany . |
| 21720 | 10/1977 | Japan . |
| 59095 | 12/1977 | Japan . |
| 56196 | 6/1978 | Japan . |
| 22637 | 2/1981 | Japan . |
| 22638 | 7/1981 | Japan . |

*Primary Examiner*—Jack Cooper
*Attorney, Agent, or Firm*—Fisher, Christen & Sabol

[57] ABSTRACT

A method for producing goethite having an axial ratio of at least 7 and a specific surface area of 20–80 m$^2$/g and suitable for use in the production of $\alpha$-iron powder, which method comprises intermittently feeding an oxidizing gas into a suspension of ferrous hydroxide, which has been obtained by reacting a ferrous salt with an alkali hydroxide, preferably while controlling the oxidation rate of ferrous hydroxide below 7% per each feeding-feed-stopping cycle of the oxidizing gas and also controlling the feeding time period of the oxidizing gas within 10 minutes and shorter than a quarter of the feed-stopping time period per each feeding-feed-stopping cycle of the oxidizing gas.

8 Claims, 3 Drawing Sheets

PRODUCTION METHOD OF GOETHITE

This application is a continuation of prior U.S. application Ser. No. 398,292, filed Aug. 23, 1989, which is a continuation of application Ser. No. 751,963, filed Jul. 5, 1985, which is a continuation of application Ser. No. 597,693, filed May 6, 1984, which is a continuation of Ser. No. 450,535, filed Dec. 17, 1982, all now abandoned.

BACKGROUND OF THE INVENTION

1. Field of the Invention

This invention relates to a production method of goethite which is useful as a raw material for magnetic materials such as α-iron powder, magnetite, γ-$Fe_2O_3$ and the like.

2. Description of the Prior Art

When processing a powdery raw material into a useful product, it has been well-known that properties stemming from the size, shape, crystallinity and the like of the particles play an important role. This also applies to magnetic materials. The size, shape, crystallinity and the like of goethite particles, which is a starting raw material, significantly affect the properties of a magnetic material to be obtained from the starting raw material. The control of the size, shape, crystallinity and the like of goethite particles has been the subject of a great deal of work. Among such physical properties of goethite particles, it has been considered to be the most difficult to control the particle size distribution.

For example, Japanese Patent Publication No. 21720/1977 discloses a production method of goethite in which ferrous hydroxide is vigorously agitated for at least several hours in a non-oxidizing atmosphere into a uniform system, followed by subjecting the thus-prepared uniform system to oxidation. However, it is difficult to convert a non-uniform floc containing ferrous hydroxide into a sufficiently uniform system by merely agitating the floc.

Another method is disclosed in Japanese Patent Laid-open No. 56196/1978 in which a non-uniform floc containing ferrous hydroxide is subjected to a neutralization reaction in the presence of a soluble silicate so as to make the floc uniform; and acicular goethite particles are then allowed to undergo a uniform growth reaction. However, when practicing the above method, it is necessary to use the soluble silicate in an amount as much as 0.1–1.7 atom % in terms of Si on the basis of Fe. Moreover, goethite takes the silicate therein and is thus converted into such a form as if diluted by the silicate. As a corollary to this, the magnetic properties of iron powder, which is to be obtained by reducing the above silicate-added raw material in a manner commonly known in the art, will be poor.

A further method is disclosed in Japanese Patent Laid-open No. 59095/1977 in which goethite is produced by controlling the oxidation velocity or rate of ferrous hydroxide, for example, in such a way that 8 wt.%, 25–55 wt.% and the remainder of ferrous hydroxide are oxidized in turn in a first stage of 0.5–4 hours, a second stage of 1.5–6 hours and a third stage of completing the oxidation of ferrous hydroxide in its entirety. In the above method, it is necessary to change the oxidation velocity in various ways in the course of the production process of goethite, thereby taking a relatively long time for the completion of the oxidation. In addition, it is also required to carefully control the oxidation velocity.

A still further approach is disclosed in Japanese Patent Laid-open No. 22637/1981 in which seed crystals, which have in advance been prepared at room temperature, are employed. This method, however, involves such a potential problem that more magnetite may occur than goethite unless the reaction conditions, particularly, the temperature conditions are precisely controlled.

SUMMARY OF THE INVENTION

An object of this invention is to provide an improved production method of goethite which is useful as a raw material for the production of magnetic materials such as α-iron powder, magnetite, γ-$Fe_2O_3$ and the like.

Another object of this invention is to provide uniform goethite particles having an axial ratio of at least 7 and a specific surface area of 20–80 $m^2/g$.

A further object of this invention is to provide goethite having a well-controlled particle size distribution by correlating the oxidation velocity of ferrous hydroxide with the crystal growth velocity of goethite.

The above-described objects of this invention can be achieved by intermittently feeding an oxidizing gas into a suspension of ferrous hydroxide, which has been obtained by reacting a ferrous salt with an alkali hydroxide, preferably while controlling the oxidation rate of ferrous hydroxide below 7% per each feeding-feed-stopping cycle of the oxidizing gas and also controlling the feeding time period of the oxidizing gas within 10 minutes and shorter than a quarter of the feed-stopping time period per each feeding-feed-stopping cycle of the oxidizing gas.

DESCRIPTION OF THE PREFERRED EMBODIMENTS

Figure 1:
FIG. 1 is a photomicrograph (magnification: X30,000) of goethite particles obtained by intermittently feeding an oxidizing gas in Example 4.

The important feature of this invention is to feed an oxidizing gas intermittently into a suspension of ferrous hydroxide. Namely, an intermittent feeding of the oxidizing gas can balance the oxidation reaction of ferrous hydroxide with the growth reaction of resulting goethite particles, thereby obtaining acicular goethite having well-controlled particle size distribution.

The oxidizing gas useful in the practice of this invention is an oxygen-containing gas. For instance, oxygen gas, air, or a gaseous mixture obtained by diluting oxygen gas or air with another gas may be effectively used.

The intermittent feeding of the oxidizing gas may be carried out by repeatedly alternating a feeding of the oxidizing gas and its stopping.

In the present invention, it is preferred to make the feeding time period of the oxidizing gas shorter than the feed-stopping time period of the oxidizing gas per each feeding-feed-stopping cycle of the oxidizing gas. More preferably, the feeding time period of the oxidizing gas may be made shorter than a quarter of its feed-stopping time period per each feeding-feed-stopping cycle of the oxidizing gas. The number of cycles of feeding and feed-stopping of the oxidizing gas is at least 10 times.

It is preferable to control the oxidation rate of ferrous hydroxide below 10%, and more preferably below 7% per each feeding-feed-stopping cycle of the oxidizing gas. If the oxidation rate exceeds 10%, the above-mentioned oxidation reaction and growth reaction are not balanced and such a high oxidation rate is thus undesirable for the fulfillment of the objects of this invention.

The oxidizing gas is fed for a time period sufficient to satisfy the above-described oxidation rate. Specifically, the feeding time period is generally with 20 minutes per each feeding-feed-stopping cycle of the oxidizing gas. The preferred feeding time period is within 10 minutes per each feeding-feed-stopping cycle of the oxidizing gas. If the oxidizing gas is fed for a period exceeding 20 minutes per each feeding-feed-stopping cycle, a longer time period is required to complete each feeding-feed-stopping cycle of the oxidizing gas, leading to a time-consuming production of goethite which production is impractical.

If each feeding-feed-stopping cycle becomes shorter, another problem arises on the reactor upon effecting the oxidation reaction. Namely, if each feeding-feed-stopping cycle of the oxidizing gas is made shorter upon intermittently feeding the oxidizing gas into a suspension of ferrous hydroxide, a fresh supply of the oxidizing gas may be charged into the suspension while the preceding supply of the oxidizing gas is still left in the suspension. If the above situation should occur, the effects of this invention may not be obtained. The lower limit of the time period of each feeding-feed-stopping cycle may vary depending on the type of each reactor employed to oxidize the suspension. The above feeding-feed-stopping cycle should, however, at least 5 minutes, and preferably at least 10 minutes from the practical viewpoint.

In order to achieve the objects of this invention still more effectively, it is effective to charge a non-oxidizing gas into the suspension and/or the reaction atmosphere while stopping the supply of the oxidizing gas. This may be readily achieved by feeding the oxidizing gas and non-oxidizing gas together into the suspension of ferrous hydroxide and/or the reaction atmosphere and stopping the supply of the oxidizing gas only; or by changing the supply of the oxidizing gas to the supply of the non-oxidizing gas.

The oxidation rate of ferrous hydroxide per each feeding-feed-stopping cycle of the oxidizing gas may be varied at will in the present invention by controlling the feeding time period of the oxidizing gas, the concentration of an oxidizing component in the oxidizing gas, the feeding velocity of the oxidizing gas, etc. The size of the resulting goethite may be changed by varying the oxidation rate per each feeding-feed-stopping cycle of the oxidizing gas or the reaction temperature.

Figure 2:
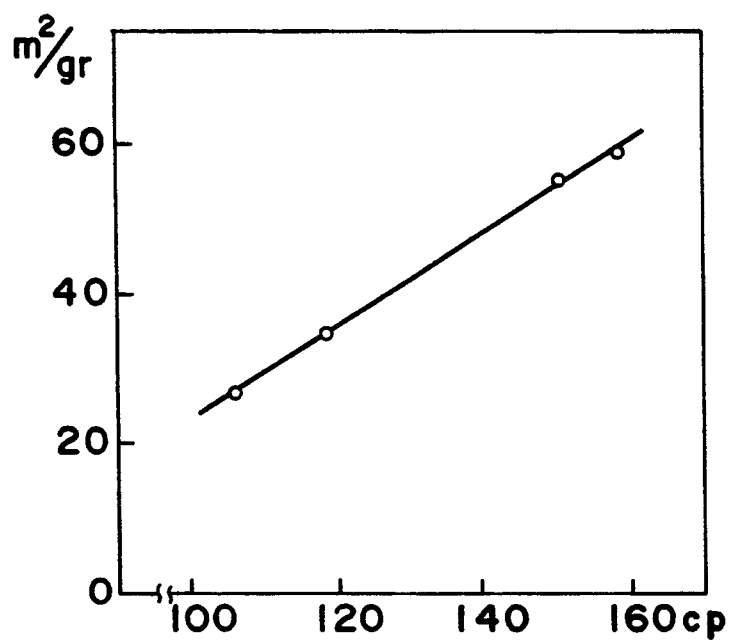
FIG. 2 is a graph showing the relation between slurry viscosity and the specific surface area of goethite particles at a slurry concentration of 1%.

The present invention is capable of varying the size of goethite within a specific area range of 20–80 m$^2$/g as measured in accordance with the BET isothermic absorption method and maintaining its particle size distribution constant. As one of the features of this invention, may be mentioned that resulting goethite particles have crystallinity consisting principally of articular crystals having an axial ratio of 7 or higher and substantially free of trees or twins. As a result, the viscosity of each goethite slurry is governed solely by the sizes of goethite particles. When practicing the method of this invention while maintaining the ratio of the feeding time period of the oxidizing gas to its feed-stopping time period constant, the slurry viscosity increases linearly in proportion to the specific surface area (a physical quantity representing the sizes of goethite particles) over a specific surface area range of from 25 to 60 m$^2$/g as illustrated in FIG. 2. In other words, it is possible to control the sizes of goethite particles by controlling the viscosity of a slurry of the goethite particles. This feature had not been predicted at all from the prior art technology but is a merit typical to the present invention. The control of viscosity is, needless to say, carried out by controlling the oxidation rate of ferrous hydroxide per each feeding-feed-stopping cycle of the oxidizing gas.

The term "ferrous salt" as used herein means a water-soluble iron salt which may include ferrous sulfate, chloride, nitrate or the like. They may be used singly or in combination of two or more. It is satisfactory in quality to use those obtained on an industrial scale. No particular purification work is necessary for them.

The effects of this invention may also be brought about when oxidizing a hydroxide, which has been obtained by coprecipitating iron together with another metal such as, for example, nickel, zinc, manganese, copper or chromium, to produce goethite containing the another metal.

Any alkali hydroxide may be used in the present invention so long as it undergoes a reaction with a ferrous salt to form ferrous hydroxide. For example, an aqueous solution of potassium hydroxide or sodium hydroxide can be used effectively. The formation and oxidation reactions of ferrous hydroxide may be carried out at temperatures within the range of from 20° to 80° C., and preferably from 30° to 50° C.

The thus-obtained goethite particles are acicular and have well-controlled particle size distribution. They are suitable as a raw material for magnetic materials such as $\alpha$-iron powder, magnetite, $\gamma$-Fe$_2$O$_3$ and the like which are obtained by reducing the goethite particles and optionally oxidizing the thus-reduced goethite particles in a manner known per se in the art.

EXAMPLE 1

Into a stainless steel vessel having an internal capacity of 18 liters and equipped with temperature controlling means and stirring means, were charged 8 liters of an aqueous solution of caustic soda (concentration: 1.8 moles/liter). Through gas feeding means arranged in concentric circles on the bottom of the vessel, the supply of nitrogen gas into the aqueous solution of caustic soda was started at a flow rate of 5.0 liters/minute. Eight liters of an aqueous solution of ferrous sulfate (concentration: 0.226 mole/liter) were added while stirring the aqueous solution of caustic soda. Upon adding the aqueous solution of ferrous sulfate into a large excess of the aqueous solution of caustic soda, a neutralization reaction took place spontaneously, thereby obtaining ferrous hydroxide as a suspension. Goethite was produced by intermittently oxidizing the suspension. The temperature of the suspension was maintained at 5020 ±1° C. during the neutralization reaction and oxidation reaction. Through a gas-feeding device allowing nitrogen gas to flow therethrough, air was additionally allowed to pass at a flow rate of 2.0–3.0 liters/minute. The air feeding time period was set for 2 minutes while the feeding time period of nitrogen gas only without feeding air was set for 18 minutes. In other words, the oxidizing gas was fed for 2 minutes while its feeding was suspended for 18 minutes. Each feeding-feed-stopping cycle of the oxidizing gas was thus 20 minutes long. The content of iron [II] in each suspension was determined in terms of the concentration of divalent iron ions in accordance with the titrimetric method which relied upon potassium permanganate. The oxidation percentage rate was calculated in accordance with the following equation:

$$\text{oxidation percentage} = \frac{\text{Total concentration of iron ions} - Fe^{2+} \text{ concentration}}{\text{Total concentration of iron ions}} \times 100(\%)$$

When the suspension developed a vivid yellow color, the feeding-feed-stopping cycles of the oxidizing gas were terminated. At that stage, the oxidation rate was over 99.7%. The vessel was exposed to the surrounding atmosphere and allowed to stand for 1 hour while stirring the suspension. The viscosity of the suspension was measured by a B-type viscometer after allowing the suspension to stand as mentioned above. It was 106 c.p.s. Since the feeding-feed-stopping cycle of the oxidizing gas was repeated 30 times in the present Example, the total feeding time period of the oxidizing gas was calculated as 60 minutes. The slurry contained acicular goethite particles. After wasting the slurry with water and then filtering same, wet cake was obtained. The specific surface area of the goethite particles was measured in accordance with the BET isothermic adsorption method, using nitrogen gas. As their specific surface area, a value of 26.4 m$^2$/g was obtained. The size of each particle was 10–13 in terms of length/width ratio and the length of each particle was 0.3–0.4 µm.

EXAMPLES 2-4

Production of goethite was carried out under the same conditions as in Example 1 except that only the reaction temperature was changed in Examples 2 and 3 and both the reaction temperature and the feed-stopping manner of the oxidizing gas were varied in Example 4. Namely, the supply of nitrogen gas was stopped at the same time as the supply of the oxidizing gas was stopped in Example 4. As a result, the atmosphere in the reactor was considered to contain oxygen gas even while the feeding of the oxidizing gas was stopped. The viscosity of a slurry of goethite and the specific surface area of goethite obtained after completion of the reactions in each of those Examples are shown in Table 1.

TABLE 1

|  | Ex. 2 | Ex. 3 | Ex. 4 |
| --- | --- | --- | --- |
| Reaction temperature (°C.) | 40 | 30 | 40 |
| Slurry viscosity (cps) | 158 | 150 | 118 |
| Specific surface area (m$^2$/g) | 59.3 | 55.5 | 34.9 |

The slurry viscosity and the specific surface area of goethite obtained in each of these Examples 2–4 and the preceding Example 1 were plotted, respectively, along the horizontal axis and vertical axis, thereby obtaining a graph as shown in FIG. 2. From the graph, it can be seen that the specific surface area changes linearly with respect to the slurry viscosity. Although oxygen gas was contained in the atmosphere in Example 4, the resulting goethite satisfactorily fulfilled the objects of this invention. A transmission electron micrograph (magnification: X30,000) of goethite particles obtained in Example 4 is shown as FIG. 1.

EXAMPLE 5

Into a stainless steel vessel having an internal capacity of 16 liters and equipped with temperature controlling means and stirring means were charged 6 liters of an aqueous solution of sodium hydroxide (concentration 1.8 moles/liter). Through gas feeding means arranged in concentric circles on the bottom of the vessel, the supply of nitrogen gas into the aqueous solution of sodium hydroxide was started at a flow rate of 5.0 liters/minute. Six liters of an aqueous solution of ferrous chloride (concentration: 0.225 mole/liter) were added while stirring the aqueous solution of sodium hydroxide. Upon adding the aqueous solution of ferrous chloride into a large excess of the aqueous solution of sodium hydroxide, a neutralization reaction took place spontaneously, thereby obtaining ferrous hydroxide as a suspension. By oxidizing the suspension intermittently with an oxidizing gas, was produced iron α-oxyhydroxide. The temperature of the suspension was maintained at 40°±10° C. during the neutralization reaction and oxidation reaction. Air was then caused to flow at a flow rate of 2.5–3.5 liters/minute through a gas-feeding device through which nitrogen gas had been caused to flow. At the same time, the flow rate of nitrogen gas was reduced from 5 liters/minute to 2.5–3.0 liters/minute. The feeding time period of air was set for 2 minutes, while the feeding time period of nitrogen gas only at the flow rate of 2.5–3.0 liters/minute was set for 28 minutes. In other words, the oxidizing gas was fed for 2 minutes while its supply was stopped for 28 minutes. Accordingly, each feeding-feed-stopping cycle was 30 minutes long. This intermittent feeding of the oxidizing gas was repeated and the intermittent oxidation was stopped as soon as the suspension developed a vivid yellow color. When the oxidation rate was measured at the above stage in accordance with the same method as used in Example 1, the oxidation rate was found to exceed 99.8%. The vessel was exposed to the surrounding atmosphere and allowed to stand for 1 hour while stirring the suspension. The viscosity of the suspension was measured by a B-type viscometer after allowing the suspension to stand as mentioned above. It was 133 c.p.s. The specific surface area of the iron α-oxyhydroxide obtained in the present Example was 34.8 m$^2$/g. The total oxidizing time period was 60 minutes in the present Example. The specific surface area of the iron α-oxyhydroxide obtained in the present Example was substantially the same as that of goethite obtained in Example 4 but the slurry viscosity of the ion α-oxyhydroxide was greater than that of the goethite. An observation by a transmission electron microscope found that each particle of the iron α-oxyhydroxide was shorter in the width direction and had a greater length/width ratio compared with the goethite obtained in Example 4. The length/width ratios were 10–13 in Examples 1–4 whereas the length/width ratio was about 15 in the present Example.

EXAMPLE 6

Iron α-oxyhydroxide was prepared following the procedure of Example 5 except that the feeding time period and the feed-stopping time period of the oxidizing gas were changed to 2 minutes and 8 minutes, respectively. The total oxidizing time was 60 minutes. The viscosity of the resultant iron -oxyhydroxide slurry was 193 c.p.s. while the specific surface area of the iron α-oxyhydroxide was 57.7 m²/g. Since the iron α-oxyhydroxide particles obtained in the present Example had lengths which were scattered over a wide range of from less than 0.1 μm to 0.5 μm, it was found that any feeding time periods of the oxidizing gas equal to a quarter of a feed-stopping time period of the oxidizing gas are not preferred.

COMPARATIVE EXAMPLE

Figure 3:
FIG. 3 is a photomicrograph (magnification: X30,000) of goethite particles obtained by continuously feeding an oxidizing gas in the Comparative Example.

A suspension of ferrous hydroxide was continuously oxidized for 600 minutes which is equivalent to the total time of all the cycles in each of Examples 1 to 4. In this Comparative Example, the oxidation velocity was carefully controlled so as to maintain it as constant as feasible with a view toward facilitating a comparison of this Comparative Example with the above Examples. The oxidation rate was measured at every 20th minute. Variation of the oxidation velocity was minimized as much as possible by adjusting the flow rate of the oxidizing gas. As a result, the oxidation velocity was maintained substantially at a constant level. The viscosity of the resultant iron α-oxyhydroxide slurry was 165 c.p.s. whereas the specific surface area of the thus-prepared iron α-oxyhydroxide particle was 51 m²/g. As shown in FIG. 3, the ion α-oxyhydroxide particles contained both large and small particles. In the present Comparative Example, the procedures of Examples 1 to 4 were strictly followed until the suspension of ferrous hydroxide had been obtained. The reaction temperature was maintained at 40°±1° C.

As is clear from the above results, the objects of this invention can be effectively achieved by feeding an oxidizing gas intermittently.

Overall Evaluation on Particle Size and Shape

The mean length, standard deviation and $$\text{cofficient of variation} \left( = \frac{\text{standard deviation}}{\text{mean length}} \times 100 \right)$$

of the particles obtained in each of Examples 2, 3 and 4 as well as the Comparative Example are shown in Table 2.

TABLE 2

|  | Example 2 (not shown) | Example 3 (not shown) | Example 4 (FIG. 1) | Com. Ex. (FIG. 3) |
| --- | --- | --- | --- | --- |
| Mean length (μm) | 0.151 | 0.155 | 0.235 | 0.166 |
| Standard deviation | 0.069 | 0.072 | 0.112 | 0.092 |
| Coefficient of variation (%) | 45.7 | 46.5 | 47.7 | 55.4 |

According to Table 2, the particles obtained in the Comparative Example have greater variation in length than the particles prepared in each of Examples 2, 3 and 4 which relate to the present invention. Furthermore, the coefficient of variation will increase as the length becomes longer. However, the coefficient of variation of the particles obtained in Example 4 of the present invention is smaller by as much as 14% compared with the result obtained in the Comparative Example although the mean length of the former particles is longer than that of the particles obtained in the Comparative Example.

What is claimed is:

1. A method for producing goethite particles by oxidizing a ferrous hydroxide suspension, which has been obtained by reacting a ferrous salt solution with an alkali hydroxide solution, with an oxidizing gas, which method comprises intermittently feeding the oxidizing gas into the suspension, the oxidation percentage of ferrous hydroxide being 10 percent or less per time period of feeding and feed-stopping of the oxidizing gas, the feeding time period of the oxidizing gas being 10 minutes or shorter and shorter than a quarter of the feed-stopping time period of the oxidizing gas, the number of cycles of feeding and feed-stopping of the oxidizing gas being at least 10 times, and the oxidation being carried out by feeding and feed-stopping oxidizing gas at a temperature ranging to 20° to 80° C., until essentially all the ferrous hydroxide has been oxidized to goethite said method being conduced in a single stirred-type reactor, said geothite particles having a particle specific surface area of from 20 to 80 m²/g, an axial ratio of least 7 and a coefficient of variation of 47.7 percent or less.

2. The method as claimed in claim 1 wherein the oxidizing gas is intermittently fed while continuously feeding inert gas.

3. The method as claimed in claim 1 wherein the oxidizing gas and an inert gas are alternatively fed.

4. The method as claimed in claim 1 wherein each cycle of feeding and feed-stopping of the oxidizing gas is 5 minutes or longer.

5. The method as claimed in claim 1 wherein the oxidization percentage of ferrous hydroxide is 7 percent or less per each cycle of feeding and feed-stopping of the oxidizing gas, the feeding time period of the oxidizing ga sis 10 minutes or shorter per each cycle of feeding and feed-stopping of the oxidizing gas, and each cycle of feeding and feed-stopping of the oxidizing gas is 10 minutes or longer.

6. The method as claimed in claim 1 wherein the suspension, at the end of said method, has a viscosity of about 106 to 158 cp.

7. The method as claimed in claim 1 wherein the oxidizing gas is intermittently fed while continuously feeding inert gas, or the oxidizing gas and an inert gas are alternatively fed, wherein the oxidization percentage of ferrous hydroxide is 7 percent or less per each cycle of feeding and feed-stopping of the oxidizing gas, wherein each cycle of feeding and feed-stopping of the oxidizing gas is 10 minutes or longer.

8. The method as claimed in claim the goethite wherein particles contain a non-ferrous metal selected from the group consisting of nickel, zinc, manganese, copper and chromium and are produced by oxidizing a ferrous hydroxide which has been obtained by co-precipitating iron together with said non-ferrous metal.

* * * * *